(12) United States Patent
Huang et al.

(10) Patent No.: US 10,928,136 B2
(45) Date of Patent: Feb. 23, 2021

(54) STEEL SCRAP PREHEATING-TYPE ELECTRIC FURNACE AND METHOD FOR IMPROVING HEATING COLD AREA OF SIDE WALL CHARGING ELECTRIC ARC FURNACE

(71) Applicant: CISDI ENGINEERING CO., LTD, Chongqing (CN)

(72) Inventors: Qiming Huang, Chongqing (CN); Zhan Gao, Chongqing (CN); Weizhi Shi, Chongqing (CN); Cunzhen Tan, Chongqing (CN)

(73) Assignee: CISDI ENGINEERING CO., LTD, Chongqing (CN)

( * ) Notice: Subject to any disclaimer, the term of this patent is extended or adjusted under 35 U.S.C. 154(b) by 0 days.

(21) Appl. No.: 15/911,957

(22) Filed: Mar. 5, 2018

(65) Prior Publication Data

US 2018/0195799 A1 Jul. 12, 2018

Related U.S. Application Data

(63) Continuation of application No. PCT/CN2016/090530, filed on Jul. 19, 2016.

(30) Foreign Application Priority Data

Oct. 30, 2015 (CN) .......................... 201510727925.0

(51) Int. Cl.
*F27D 13/00* (2006.01)
*F27B 3/18* (2006.01)
(Continued)

(52) U.S. Cl.
CPC ................ *F27B 3/18* (2013.01); *C21C 5/565* (2013.01); *F27D 13/002* (2013.01);
(Continued)

(58) Field of Classification Search
CPC ..... C21C 5/4673; C21C 5/527; C21C 5/5217; C21C 5/5252; C21C 5/5294; C21C 5/565;
(Continued)

(56) References Cited

U.S. PATENT DOCUMENTS

| 5,400,358 A | 3/1995 | Vallomy | |
| 5,882,578 A * | 3/1999 | Fuchs | C21C 5/5252 266/143 |

(Continued)

FOREIGN PATENT DOCUMENTS

DE 4025249 A1 2/1992

*Primary Examiner* — Hung D Nguyen
(74) *Attorney, Agent, or Firm* — Michael D. Eisenberg

(57) ABSTRACT

The present invention discloses a scrap steel preheating type electric arc furnace and a method for improving a heating cold region of a side wall charging electric arc furnace. This invention includes an electric arc furnace body and an inclined scrap steel preheating chamber. An included angle between the inclined scrap steel preheating chamber and a horizontal plane is 30° to 65°. Flue gas enters the inclined scrap steel preheating chamber, penetrates through the material blocking tooth rake and the scrap steel and is sucked out. The preheated scrap steel slides to a center of the electric arc furnace body along a slot bottom of the inclined scrap steel preheating chamber. The present invention overcomes a problem of lateral stacking of the side wall charging electric arc furnace, reducing impact force of the scrap steel to the device and greatly enhancing reliability of the device.

10 Claims, 4 Drawing Sheets

(51) Int. Cl.
*F27D 17/00* (2006.01)
*C21C 5/56* (2006.01)
*F27D 3/00* (2006.01)
*C21C 5/52* (2006.01)

(52) U.S. Cl.
CPC ......... *F27D 17/003* (2013.01); *F27D 17/004* (2013.01); *C21C 5/5294* (2013.01); *C21C 2005/5282* (2013.01)

(58) Field of Classification Search
CPC ... C21C 5/567; C21C 2005/5282; F27B 3/04; F27B 3/065; F27B 3/085; F27B 3/12; F27B 3/18; F27B 3/183; F27B 3/186; F27B 3/205; F27B 3/225; F27B 3/26; F27B 3/28; F27D 3/00; F27D 3/0024; F27D 3/0025; F27D 3/0026; F27D 3/0027; F27D 3/003; F27D 3/0031; F27D 3/0032; F27D 3/0033; F27D 3/04; F27D 3/06; F27D 3/10; F27D 3/1509; F27D 3/18; F27D 13/00; F27D 13/002; F27D 17/001; F27D 17/002; F27D 17/003; F27D 17/004; F27D 17/008; B65G 37/00
USPC ........ 373/60, 79, 80, 81, 85, 86, 87; 266/44, 266/143, 156, 159, 168, 186, 207, 216; 414/21, 198
See application file for complete search history.

(56) References Cited

U.S. PATENT DOCUMENTS

| | | | |
|---|---|---|---|
| 6,024,912 A * | 2/2000 | Wunsche | C21C 5/565 266/156 |
| 6,274,081 B1 * | 8/2001 | Fuchs | C21C 5/527 266/216 |
| 6,389,054 B1 * | 5/2002 | Stercho | F27B 3/18 373/79 |
| 6,404,800 B1 * | 6/2002 | Fuchs | C21C 5/565 373/80 |
| 6,450,804 B2 * | 9/2002 | Vallomy | F27B 3/18 373/79 |
| 2004/0239014 A1 * | 12/2004 | Fuchs | F27B 3/065 266/186 |
| 2007/0013112 A1 | 1/2007 | Fuchs | |
| 2016/0003542 A1 * | 1/2016 | Huang | C21C 5/527 373/80 |

* cited by examiner

STEEL SCRAP PREHEATING-TYPE ELECTRIC FURNACE AND METHOD FOR IMPROVING HEATING COLD AREA OF SIDE WALL CHARGING ELECTRIC ARC FURNACE

CROSS-REFERENCE TO RELATED APPLICATIONS

This is a continuing application, under 35 U.S.C. § 120, of copending international application No. PCT/CN2016/090530, filed Jul. 19, 2016, which designated the United States and was not published in English; this application also claims the priority, under 35 U.S.C. § 119, of Chinese patent application No. 201510727925.0, filed Oct. 30, 2015; the prior applications are herewith incorporated by reference in their entirety.

STATEMENT REGARDING FEDERALLY SPONSORED RESEARCH OR DEVELOPMENT

Not Applicable

FIELD OF THE INVENTION

The invention belongs to the technical field of metallurgy, and particularly relates to a scrap steel preheating type electric arc furnace and a method for improving a heating cold region of a side wall charging electric arc furnace.

BACKGROUND OF THE INVENTION

In electric furnace steel making, energy saving, consumption reduction and environmental protection are always core technologies in development of global electric furnace steel making technology. A technology for preheating scrap steel by electric furnace flue gas is a technology researched in China and abroad for more than two decades. However, because of great technical difficulty, only a few solutions are practically used at present, and typical representatives include CONSTEEL (US5400358-1992) technology of a finger shaft furnace (DE4025249A1-1992), vertical shaft side pushing charging (US2007/0013112A1) and vibration continuous charging.

Because flue gas can penetrate through a scrap steel layer and preheating and energy saving effects are good, vertical shaft charging and preheating can reach 60 to 100 kw·h per ton of steel, but a device is easy to be smashed by scrap steel. In addition, because the vertical shaft is added on a furnace cover, loads borne by a furnace cover rotating system are greatly increased and maintenance work is great, thereby influencing production.

CONSTEEL is a continuous horizontal charging technology, can realize steady arc smelting of an electric furnace and environmental protection, has low electrode consumption and greatly reduces expense of a production process of the electric furnace. But the method has the following defects: firstly, only an upper layer of material is heated, and a scrap steel preheating effect is poor, which is only 25 kw·h per ton of steel; secondly, to increase heat exchange efficiency with raw material (scrap steel), a stacking height on a conveyer belt of the scrap steel in a conveying chute is weak, thereby increasing the length of a preheating section; and the overall length of the device can reach 90 to 100 m, which is disadvantageous to workshop layout; and thirdly, the method has a serious air leakage phenomenon in dynamic seal and has a high capacity requirement for fans, etc.

Besides various defects in the above technology and mechanical device, the existing electric arc furnace smelting technology also has a lethal defect, i.e., the scrap steel is always added from the side wall of the electric arc furnace or added with large eccentricity, causing that cold material is accumulated at one side in a furnace chamber of the electric arc furnace, while electric arc radiant energy of the electric arc furnace is uniform all around, so that the technology has an insuperable smelting cold region in the process, thereby influencing the entire production process and further limiting the popularization of the scrap steel preheating technology.

SUMMARY OF THE INVENTION

In view of this, the purpose of the present invention is to provide a scrap steel preheating type electric arc furnace having compact device, high preheating efficiency and small charging impact and effectively overcoming a problem of a side wall charging smelt cold region of an electric arc furnace, and a method for improving a heating cold region of a side wall charging electric arc furnace.

To achieve the above purpose, the present invention provides the following technical solution: A scrap steel preheating type electric arc furnace comprises an electric arc furnace body and an inclined scrap steel preheating chamber, wherein an included angle between the scrap steel preheating chamber and a horizontal plane is 30° to 65°; the scrap steel preheating chamber is connected with the electric arc furnace body through a furnace body angular seal arranged at an outlet of a lower end and a sealing cover on the electric arc furnace body; a dust removal pipe chamber is arranged at an upper end; a material blocking tooth rake for blocking scrap steel or controlling material falling is arranged at an interface side between the scrap steel preheating chamber and the electric arc furnace body; and a driving mechanism for driving the material blocking tooth rake is correspondingly arranged on the material blocking tooth rake.

Further, the electric arc furnace further comprises a cart; the scrap steel preheating chamber is obliquely fixed to the cart; the material blocking tooth rake is arranged on the cart or the scrap steel preheating chamber and penetrates through the scrap steel preheating chamber; and one end of the driving mechanism is arranged on the cart.

Further, a positioning apparatus is arranged at a bottom of the cart.

Further, the material blocking tooth rake is mainly composed of a cross beam, rake teeth and handles; a plurality of rake teeth are arranged on the cross beam at intervals; and two handles are correspondingly arranged on both ends of the cross beam.

Further, a traction rope for drawing the material blocking tooth rake to swing is arranged on the cross beam.

Further, a turning plate sealing door is also arranged at a charging opening of an upper end of the scrap steel preheating chamber.

Further, the electric arc furnace further comprises a cold material vibration charging chute arranged at the charging opening of the upper end of the scrap steel preheating chamber, and the cold material vibration charging chute is fixed to the cart through a vibration apparatus.

Further, a sliding sealing door is arranged above the cold material vibration charging chute.

Further, the electric arc furnace also comprises an inclined rail skip bucket feeding system arranged at the charging opening of the upper end of the scrap steel preheating chamber.

The present invention also provides a method for improving a heating cold region of a side wall charging electric arc furnace, mainly comprising the following steps: 1) inclining the scrap steel preheating chamber connected with the electric arc furnace body, with an inclined angle of 30° to 65°; and 2) installing a material blocking tooth rake at an interface side between the scrap steel preheating chamber and the electric arc furnace body at a certain distance to block scrap steel or control material falling by regulating the material blocking tooth rake.

The present invention has the following beneficial effects:

1) Compared with a conventional side wall charging system, the charging system of the present invention can enable the scrap steel to slip into a position near an electrode center, thereby greatly overcoming a problem of a smelting cold region in a side wall charging technology of an electric arc furnace.

2) The charging system of the present invention has heat exchange efficiency equivalent to that of a shaft furnace, and has better energy saving effect than CONSTEEL.

3) The charging system is divided into two regions: a cold region and a hot region. Enormous impact force to be borne by one-time charging is placed on a cold charging region (i.e., a cold material vibration charging chute), thereby optimizing mechanics distribution of the charging system. The cold material vibration charging chute device has high strength, no cooling water on impacted parts and production safety and is more convenient for maintenance. A slot bottom of the preheating chamber is a bevel and the scrap steel preheating chamber and the material blocking tooth rake take controllable vibration charging, so that the impact force borne by the material blocking tooth rake is reduced by more than 80% to 90%. The charging system has high reliability and greatly overcomes water leakage and deformation problems. The material blocking tooth rake makes arc-shaped swing, thereby reducing a probability of twining the scrap steel on the material blocking tooth rake, so that not only maintainability of the material blocking tooth rake is enhanced (the preheating chamber can be drawn out if water leakage occurs), but also reliability of the entire charging system and tolerance for scrap steel material are enhanced (i.e., a scale and a weight of a single piece of scrap steel can be increased).

4) The cold material vibration charging chute can realize full-closing charging, and hot flue gas in the scrap steel preheating chamber may not leak out.

5) The scrap steel preheating chamber, the material blocking tooth rake, the cold material vibration charging chute, the dust removal pipe chamber and the like are integrated into one reversed cart, and can be separated from the electric arc furnace body through program control. Through coordination with a related sealing structure, technical actions of scrap steel preheating, sealing charging, small-angle inclination of the electric arc furnace, large-angle steel tapping and the like can be completed, thereby facilitating device maintenance.

Generally, the technology eliminates a cold region phenomenon of side wall stacking of the electric arc furnace. The entire system saves more energy, facilitates maintenance and has enormous investment and construction advantages.

BRIEF DESCRIPTION OF THE DRAWINGS

To enable the purpose, the technical solution and the advantages of the present invention to be more clear, the present invention provides the following drawings for description.

DETAILED DESCRIPTION OF THE DRAWINGS

Figure 1:
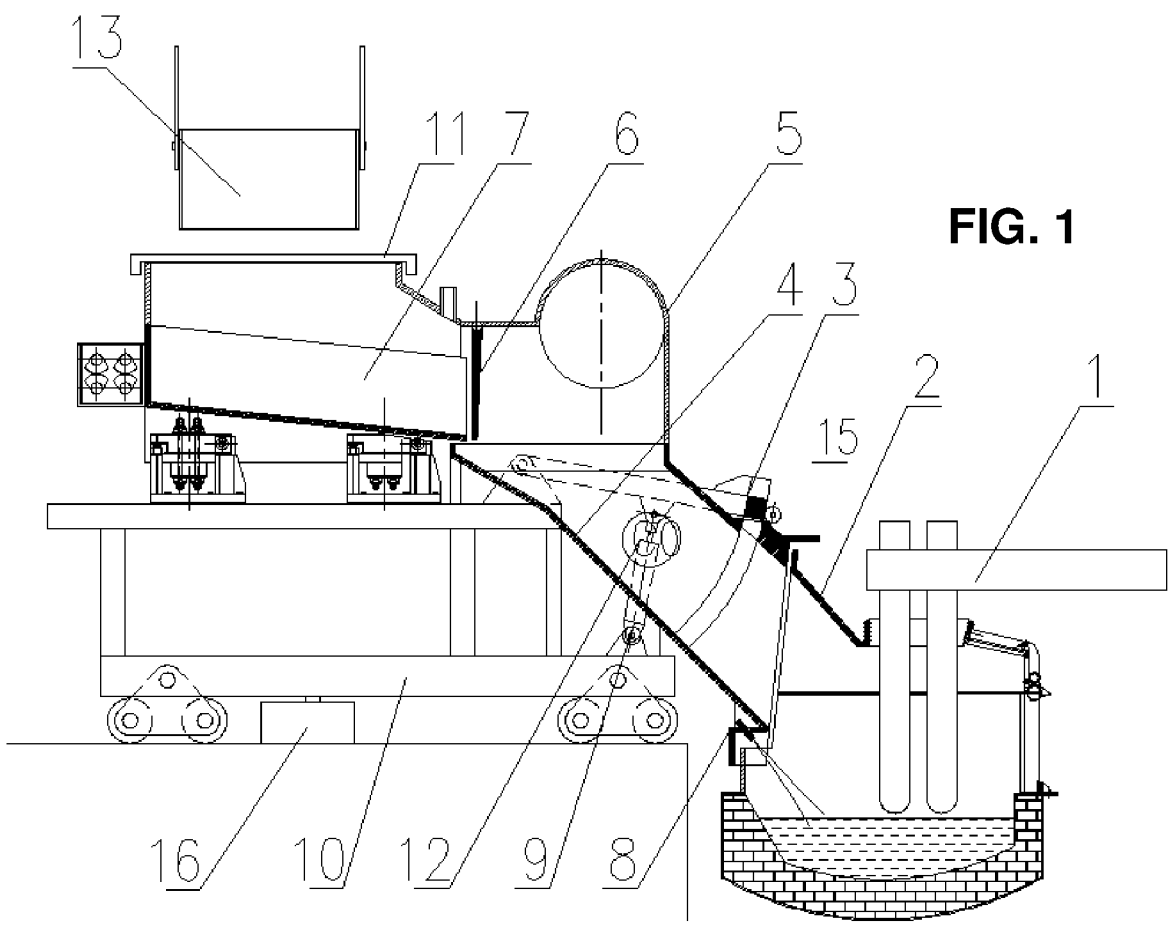
FIG. 1 is a partially cross-sectional structural schematic diagram of an exemplary embodiment of a full-sealed scrap steel preheating type electric arc furnace.
Figure 2:
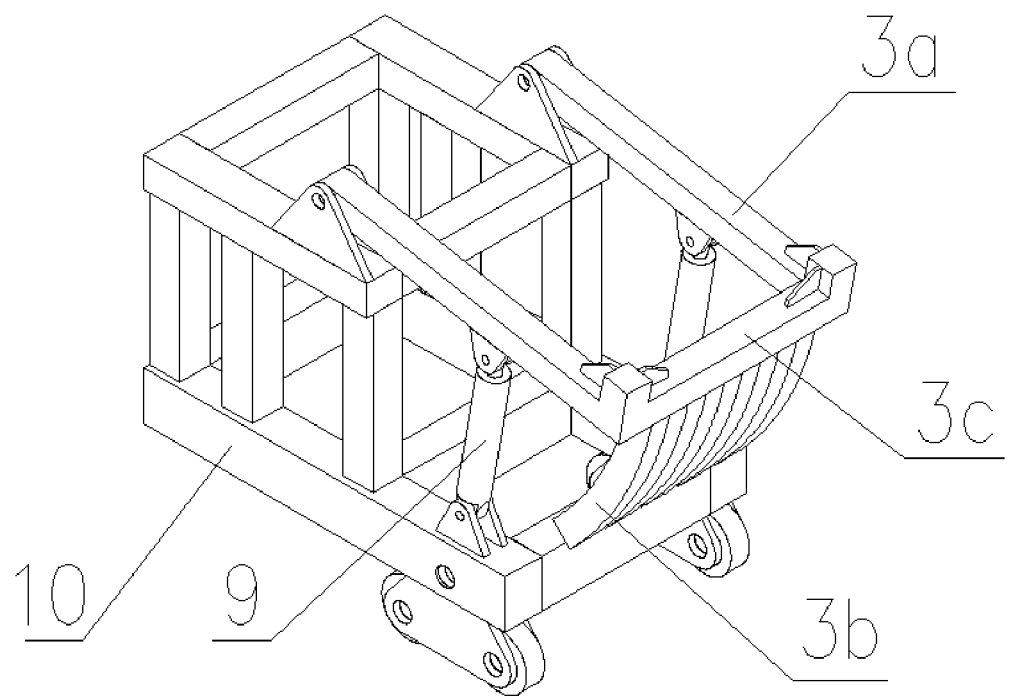
FIG. 2 is a perspective view of an exemplary embodiment of a material blocking tooth rake.

Preferred embodiments of the present invention will be described below in detail in combination with drawings.

As shown in the figure, the scrap steel preheating type electric arc furnace in the exemplary embodiment comprises an electric arc furnace body 1 and an inclined scrap steel preheating chamber 4, wherein an included angle between the scrap steel preheating chamber 4 and a horizontal plane is 30° to 65°; the scrap steel preheating chamber 4 is connected with the electric arc furnace body 1 through a furnace body angular seal 8 arranged at an outlet of a lower end and a sealing cover 2 on the electric arc furnace body 1; a dust removal pipe chamber 5 is arranged at an upper end; a material blocking tooth rake 3 for blocking scrap steel 12 or controlling material falling is arranged at an interface side between the scrap steel preheating chamber 4 and the electric arc furnace body 1; and a driving mechanism 9 for driving the material blocking tooth rake 3 is correspondingly arranged on the material blocking tooth rake 3.

Specifically, the material blocking tooth rake 3 penetrates through a housing wall above the scrap steel preheating chamber 4, blocks the scrap steel in the scrap steel preheating chamber 4 and controls material falling. Gaps are formed among the material blocking tooth rake 3 to allow flue gas to penetrate through. The flue gas of the electric arc furnace enters the scrap steel preheating chamber 4 through the material blocking tooth rake 3, penetrates through the gaps of the scrap steel 12 and is drawn out by the dust removal pipe chamber 5, so that the scrap steel 12 is preheated. After preheating for a certain time, under the action of the driving mechanism 9, the material blocking tooth rake 3 is opened, and the preheated scrap steel 12 slides to the electric arc furnace body 1 along the slot bottom of the inclined scrap steel preheating chamber 4. The driving mechanism in the present embodiment can adopt an oil cylinder, a hydraulic cylinder and other apparatuses.

Because a scrap steel material falling point depends on position height and inclined angle of the material and the inclined angle of the scrap steel preheating chamber 4 in the present embodiment is large, when the material blocking tooth rake 3 is quickly opened, the scrap steel may be thrown out along the bevel; and under horizontal component velocity and inertia effect, the scrap steel is thrown to the center of the electric arc furnace body 1 with a parabola, thereby greatly overcoming a problem of lateral stacking of the side wall charging electric arc furnace and improving the cold region. On the other hand, because a slot bottom of the scrap steel preheating chamber 4 is a bevel, the scrap steel 12 slips to the material blocking tooth rake 3 through the bottom of the scrap steel preheating chamber 4. Because less material slips down, the impact force borne by the material blocking tooth rake 3 is reduced by more than 80% to 90%, and is only 10% to 20% of entire one-time charging, thereby greatly enhancing reliability of the device.

In the present embodiment, the electric arc furnace further comprises a cart 10; the scrap steel preheating chamber 4 is obliquely fixed to the cart 10; the material blocking tooth rake 3 is arranged on the cart 10 and penetrates through the scrap steel preheating chamber 4 (rake teeth 3*b* of the material blocking tooth rake 3 penetrate through a housing wall above the scrap steel preheating chamber 4); and one end of the driving mechanism 9 is arranged on the cart 10. A positioning apparatus 16 is arranged at a bottom of the cart 10. The scrap steel preheating chamber 4, the material blocking tooth rake 3 and the like are integrated into a cart 10, so that the scrap steel preheating chamber 4 and the electric arc furnace body 1 are separated easily, thereby not only benefiting technical actions of small-angle inclination of the electric arc furnace body 1, large-angle steel tapping and the like, but also benefiting device maintenance. In addition, because an integrated mobile structure is adopted, the apparatus can realize large-angle inclination of the electric arc furnace, complete operation of steel tapping and deslagging, rotate a furnace cover and other effects, and is also convenient for emergency treatment of cooling water and water leakage accidents of the preheating apparatus.

In the present embodiment, the material blocking tooth rake 3 is mainly composed of a cross beam 3*c*, rake teeth 3*b* and handles 3*a*; a plurality of arc-shaped rake teeth 3*b* are arranged on the cross beam 3*c* at intervals; and two handles 3*a* are correspondingly arranged on both ends of the cross beam 3*c*. The cross beam 3*c* and the handles 3*a* are located outside the scrap steel preheating chamber 4. Rake teeth 3*b* are alternately arranged in scrap steel preheating chamber 4. One end of each handle 3*a* is hinged on the cart 10 (or an external structure of the scrap steel preheating chamber 4). Both ends of the driving mechanism 9 are respectively hinged on the cart 10 and the handles 3*a*. The material blocking tooth rake 3 makes arc-shaped swing under the effect of the driving mechanism 9 to realize the actions of blocking the scrap steel 12 and dropping the material.

Figure 3:
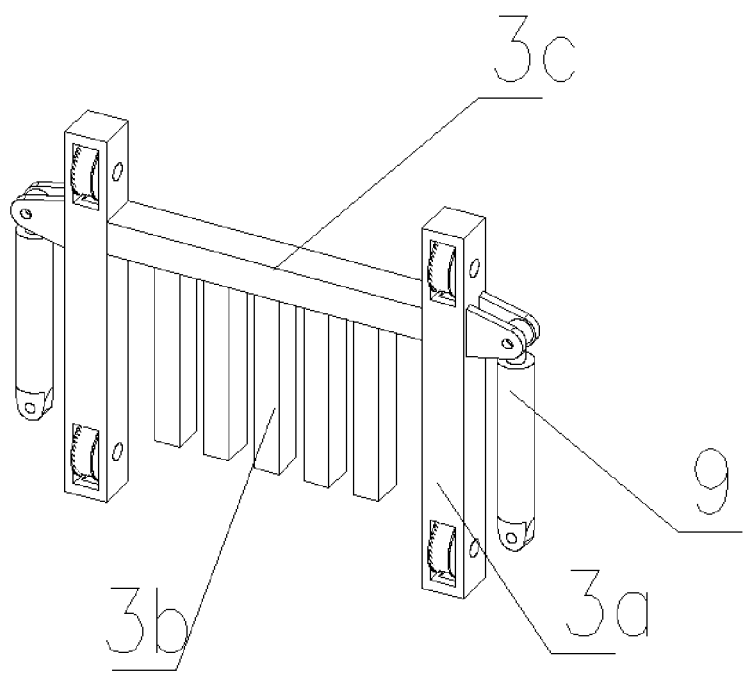
FIG. 3 is a perspective view of another exemplary embodiment of a material blocking tooth rake.
Figure 4:
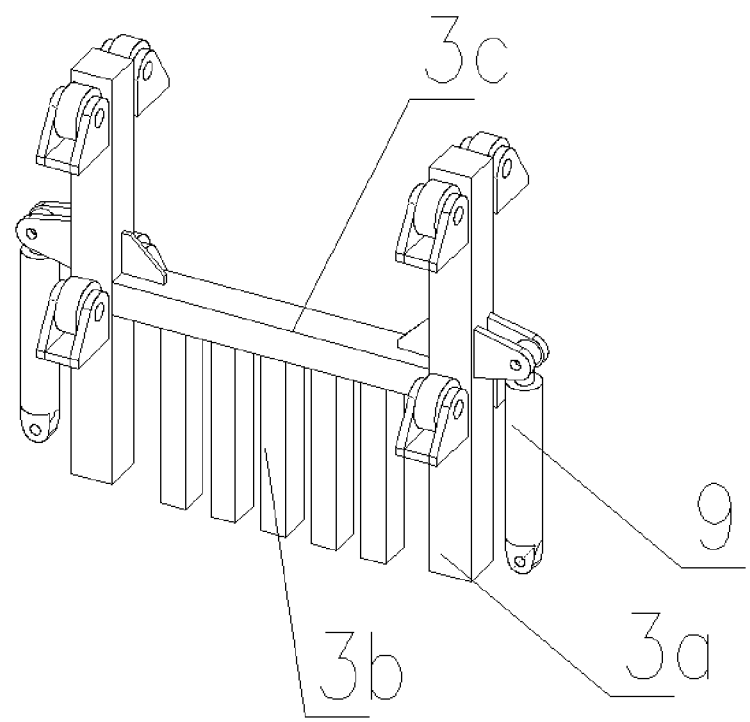
FIG. 4 is a perspective view of a further exemplary embodiment of a material blocking tooth rake.
Figure 5:
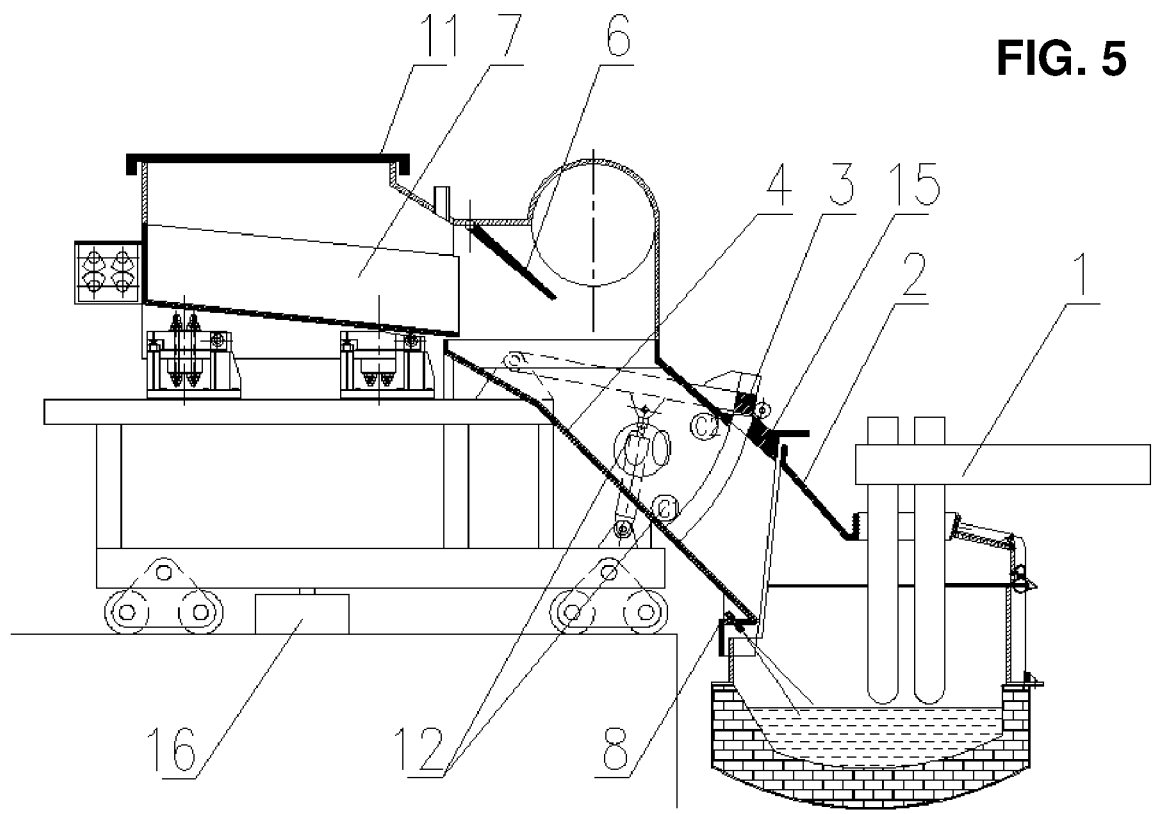
FIG. 5 is a partially cross-sectional structural schematic diagram of an exemplary embodiment of a charging process of a cold material vibration charging chute to a scrap steel preheating chamber.
Figure 6:
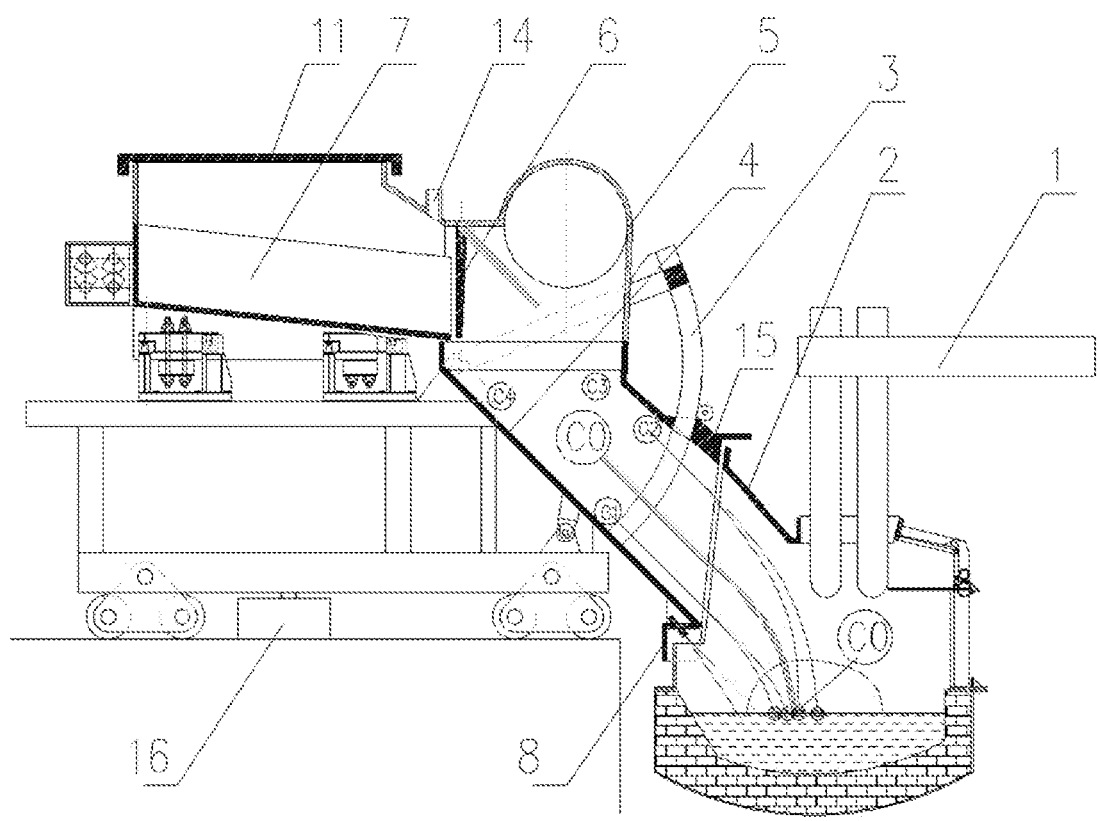
FIG. 6 is a partially cross-sectional structural schematic diagram of an exemplary embodiment of a charging process of a scrap steel preheating chamber to an electric arc furnace body.
Figure 7:
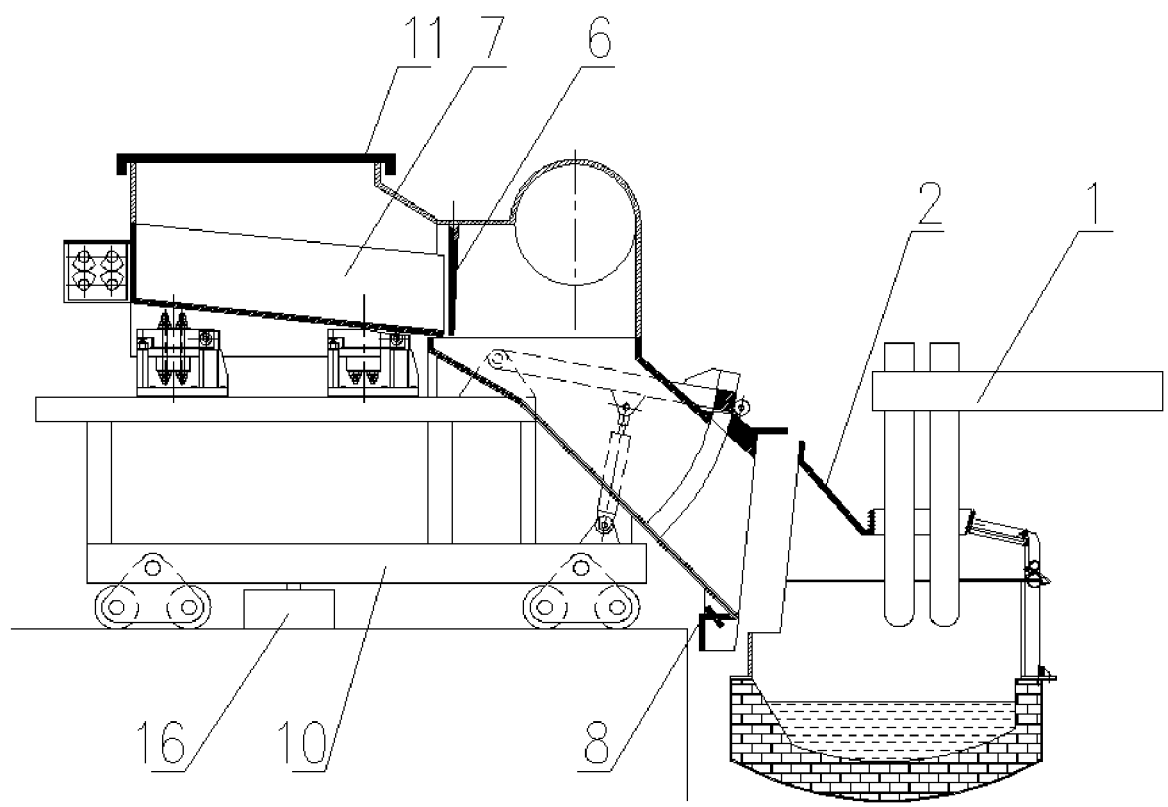
FIG. 7 is a partially cross-sectional structural schematic diagram of an exemplary embodiment of a separated state between a scrap steel preheating chamber and an electric arc furnace body.
Figure 8:
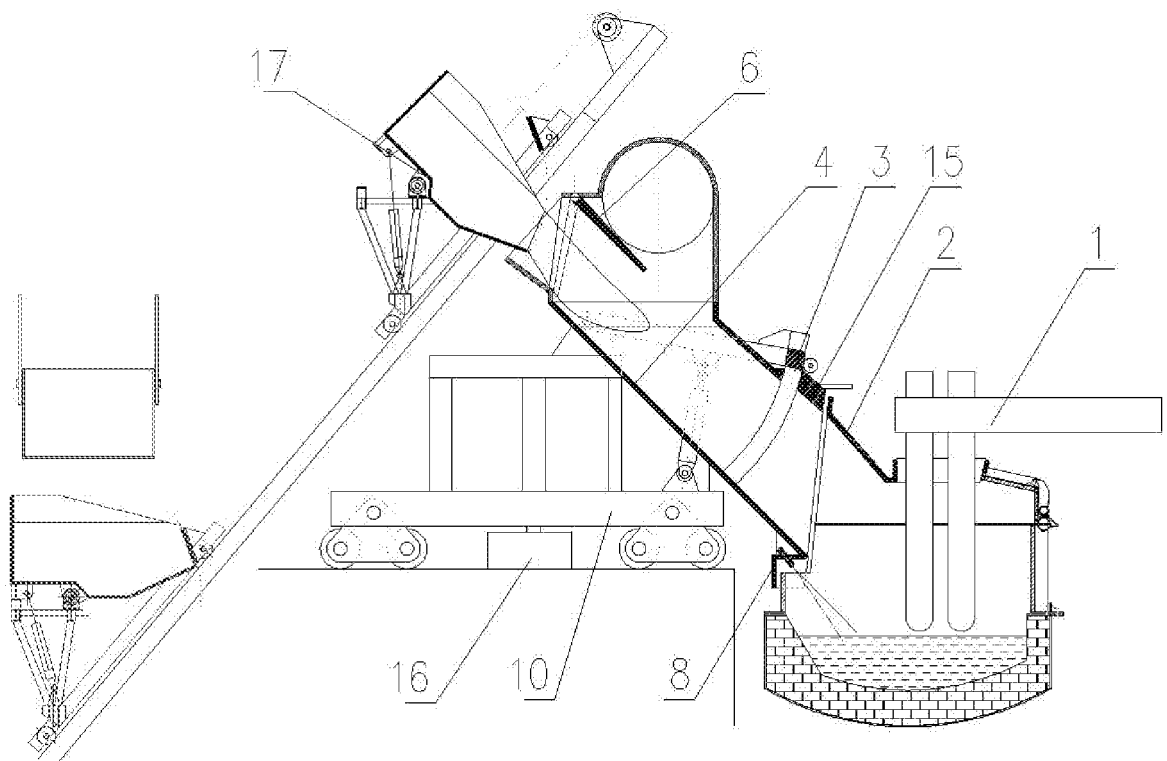
FIG. 8 is a partially cross-sectional structural schematic diagram of an exemplary embodiment of a semi-sealed scrap steel preheating type electric arc furnace.

Of course, the material blocking tooth rake 3 also has other variation forms. As shown in FIG. 3 and FIG. 4, the handles 3*a* can be restricted through a guide wheel and make synchronous arc-shaped motion or rectilinear motion (depending on shapes of the rake teeth 3*b* and the handles 3*a*) under the driving of the driving mechanism 9 to realize material blocking control.

A tooth rake seal 15 is also arranged on the scrap steel preheating chamber 4, can prevent flue gas from leaking out of gaps of the tooth rake by blowing air, and can also accommodate elastic deformation of the rake teeth 3*b*.

As a further improvement of the above solution, a traction rope for drawing the material blocking tooth rake 3 to swing is arranged on the cross beam 3*c*, and can guide the material blocking tooth rake to perform arc-shaped swing.

In the present embodiment, a turning plate sealing door 6 is also arranged at a charging opening of an upper end of the scrap steel preheating chamber 4, and the scrap steel preheating chamber 4 can be closed in a scrap steel preheating process to further ensure a preheating effect.

In the present embodiment, the electric arc furnace further comprises a cold material vibration charging chute 7 arranged at the charging opening of the upper end of the scrap steel preheating chamber 4, and the cold material vibration charging chute 7 is fixed to the cart 10 through a vibration apparatus. A sliding sealing door 11 is arranged above the cold material vibration charging chute 7. The external scrap steel 12 is conveyed into the cold material vibration charging chute 7 through a charging conveying system 13. Under the vibration effect of the cold material vibration charging chute 7, the scrap steel 12 gradually joins in the material blocking tooth rake 3 in the scrap steel preheating chamber 4. The cold material vibration charging chute 7 can resist strong impact, thereby enhancing device reliability. The cold material vibration charging chute 7 is closed by the sliding sealing door 11 and the turning plate sealing door 6 to form an independent partition bin, thereby realizing full-sealing charging of the system and ensuring that hot flue gas may not leak out.

The present embodiment also has an alternative solution, i.e., the cold material vibration charging chute 7 arranged on the charging opening of the upper end of the scrap steel preheating chamber 4 is replaced with an inclined rail skip bucket feeding system 17. Because an inclined rail has high charging speed, multi-batch small-quantity mode is adopted to reduce the impact force of the scrap steel 12 to the material blocking tooth rake 3. The method cannot realize full-sealing conveyance preheating of the material, can only achieve semi-closed production and is suitable for reformation of old electric arc furnaces.

The present invention also discloses a method for improving a heating cold region of a side wall charging electric arc furnace, mainly comprising the following steps: 1) inclining the scrap steel preheating chamber 4 connected with the electric arc furnace body 1, with an inclined angle of 30° to 65°; and 2) installing a material blocking tooth rake 3 at an interface side between the scrap steel preheating chamber 4 and the electric arc furnace body 1 at a certain distance to block scrap steel 12 or control material falling by regulating the swing condition of the material blocking tooth rake 3. Because the scrap steel 12 makes projecting motion when slipping down at the bottom of the inclined slot and leaving the slot, the scrap steel has a certain projecting distance and horizontal moving speed and is moved to be closer to the center of the electric furnace by charging.

A dropping angle of the scrap steel 12 is changed by a method of coordination between the large-inclined-angle (30° to 65°) scrap steel preheating chamber 4 and the material blocking tooth rake 3. When the material blocking tooth rake 3 is quickly opened, the scrap steel may be thrown out along the bevel; and under horizontal component velocity and inertia effect, the scrap steel is thrown to the center of the electric arc furnace body 1 with a parabola, thereby overcoming a problem of lateral stacking of the side wall charging electric arc furnace.

The action process of the present invention is described below in combination with the drawings.

As shown in FIG. 1, the electric arc furnace is smelting. The turning plate sealing door 6 is closed to prevent air from entering the dust removal pipe chamber 5. The sliding sealing door 11 is opened. The external scrap steel charging conveying system 13 charges the cold material vibration charging chute 7. The scrap steel 12 in the scrap steel preheating chamber 4 is blocked by the material blocking tooth rake 3. Flue gas is guided into the scrap steel preheating chamber 4 through a sealing cover 2, penetrates through the material blocking tooth rake 3 and the scrap steel 12 and is drawn out by the dust removal pipe chamber 5, so that the scrap steel is preheated.

At this moment, the scrap steel preheating chamber 4 is connected with the electric arc furnace body 1 through the sealing cover 2 and the furnace body angular seal 8. Perpendicular sealing planes are formed between the scrap steel preheating chamber 4 and the sealing cover 2 and between the lower part of the electric arc furnace body 1 and the furnace body angular seal 8 to allow to reserve a proper gap between the sealing planes, so that the electric arc furnace body makes technological operation of a small angle of −4° to +4°. (Note: In practice, the scrap steel preheating chamber 4 and the furnace body angular seal 8 are generally made into a whole, and the sealing cover 2 is part of a electric arc furnace cover.)

As shown in FIG. 3, the electric arc furnace is smelting. The turning plate sealing door 6 is opened. The sliding sealing door 11 is closed. The cold material vibration charging chute 7 performs continuous vibration closed charging for the scrap steel preheating chamber 4. The scrap steel 12 slips to the material blocking tooth rake 3 through the bottom of the scrap steel preheating chamber 4. The slipping process reduces the impact force borne by the material blocking tooth rake 3, and the impact force is only 10% to 20% of entire one-time charging.

As shown in FIG. 4, the material blocking tooth rake 3 is jacked up by the driving mechanism 9, and the scrap steel 12 slides to a center region of a molten pool of the electric arc furnace from the scrap steel preheating chamber 4. Meanwhile, an electrode of the electric arc furnace is appropriately lifted temporarily to avoid being hit and broken by the slipped scrap steel 12. In the figure, C0, C1, C2, C3 and C4 respectively represent results of dropping point simulation data after the scrap steel in each point position drops into the electric arc furnace body. When the scrap steel preheating chamber 4 is inclined by 45° and a friction coefficient is 0.4, after the scrap steel 12 drops into the electric arc furnace, an entire forward motion velocity component of about 3.5 m/s still exists theoretically, thereby improving the heating cold region of the electric arc furnace.

A gas blowing seal 14 is arranged above the cold material vibration charging chute 7, and can blow air in a charging process to prevent or reduce hot gas from entering the cold charging chute 7.

Finally, it should be noted that the above preferred embodiments are only used for describing the technical solution of the present invention rather than limiting the present invention. Although the present invention is already described in detail through the above preferred embodiments, those skilled in the art shall understand that various changes in form and detail can be made to the present invention without departing from the scope defined by claims of the present invention.

What is claimed is:

1. A scrap steel preheating type electric arc furnace, comprising: an electric arc furnace body and an inclined scrap steel preheating chamber, wherein: an included angle between the inclined scrap steel preheating chamber and a horizontal plane is 30° to 65°; the inclined scrap steel preheating chamber is connected with the electric arc furnace body through a furnace body angular seal arranged at an outlet of a lower end and a sealing cover on the electric arc furnace body; a dust removal pipe chamber is arranged at an upper end; a material blocking tooth rake for blocking scrap steel or controlling material falling is arranged at an interface side between the inclined scrap steel preheating chamber and the electric arc furnace body; and a driving mechanism for driving the material blocking tooth rake is correspondingly arranged on the material blocking tooth rake.

2. The scrap steel preheating type electric arc furnace according to claim 1, wherein: the electric arc furnace further comprises a cart; the inclined scrap steel preheating chamber is obliquely fixed to the cart; the material blocking tooth rake is arranged on the cart or the inclined scrap steel preheating chamber and penetrates through the inclined scrap steel preheating chamber; and one end of the driving mechanism is arranged on the cart.

3. The scrap steel preheating type electric arc furnace according to claim 2, wherein a positioning apparatus is arranged at a bottom of the cart.

4. The scrap steel preheating type electric arc furnace according to claim 2, wherein:
the material blocking tooth rake is mainly composed of a cross beam, rake teeth and handles; a plurality of rake teeth are arranged on the cross beam at intervals; and two handles are correspondingly arranged on both ends of the cross beam.

5. The scrap steel preheating type electric arc furnace according to claim 4, further comprising a traction rope for drawing the material blocking tooth rake to swing arranged on the cross beam.

6. The scrap steel preheating type electric arc furnace according to claim 1, further comprising a turning plate sealing door arranged at a charging opening of an upper end of the inclined scrap steel preheating chamber.

7. The scrap steel preheating type electric arc furnace according to claim 6, wherein the electric arc furnace further comprises a cold material vibration charging chute arranged at the charging opening of the upper end of the inclined scrap steel preheating chamber, and the cold material vibration charging chute is fixed to the cart through a vibration apparatus.

8. The scrap steel preheating type electric arc furnace according to claim 7, further comprising a sliding sealing door is arranged above the cold material vibration charging chute.

9. The scrap steel preheating type electric arc furnace according to claim 6, wherein the electric arc furnace further comprises an inclined rail skip bucket feeding system arranged at the charging opening of the upper end of the inclined scrap steel preheating chamber.

10. A method for improving a heating cold region of a side wall charging electric arc furnace, which comprises: inclining the scrap steel preheating chamber connected with the electric arc furnace body to an inclined angle of 30° to 65°; and installing a material blocking tooth rake at an interface side between the scrap steel preheating chamber and the electric arc furnace body at a given distance to block scrap steel or control material falling by regulating the material blocking tooth rake.

* * * * *